United States Patent
Stoffels et al.

(10) Patent No.: US 10,933,872 B2
(45) Date of Patent: Mar. 2, 2021

(54) MOTOR VEHICLE AND AUTONOMOUS OR SEMI-AUTONOMOUS MANEUVERING AROUND AN OBSTACLE

(71) Applicant: FORD GLOBAL TECHNOLOGIES, LLC, Dearborn, MI (US)

(72) Inventors: Harald Stoffels, Cologne NRW (DE); Ahmed Benmimoun, Aachen NRW (DE); Moritz Klaus Springer, Hagen NRW (DE); Guohui Chen, Aachen NRW (DE); Jan Linsel, Cologne NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 442 days.

(21) Appl. No.: 15/796,600

(22) Filed: Oct. 27, 2017

(65) Prior Publication Data

US 2018/0118213 A1    May 3, 2018

(30) Foreign Application Priority Data

Oct. 28, 2016  (DE) ..................... 10 2016 221 276.1

(51) Int. Cl.
  *B60W 30/18*    (2012.01)
  *B60W 10/20*    (2006.01)
  (Continued)

(52) U.S. Cl.
  CPC ..... *B60W 30/18009* (2013.01); *B60L 3/0007* (2013.01); *B60L 15/20* (2013.01);
  (Continued)

(58) Field of Classification Search
  CPC ...... B60L 15/00; B60L 15/20; B60L 2250/00; B60L 2250/16; B60L 2260/00;
  (Continued)

(56) References Cited

U.S. PATENT DOCUMENTS 9,368,034 B2    6/2016  Shin et al.
2005/0052080 A1  3/2005  Maslov et al.
(Continued)

FOREIGN PATENT DOCUMENTS

DE    102007061234 A1 *  6/2009  ............ B60W 10/06
DE    102007061234 A1     6/2009
(Continued)

OTHER PUBLICATIONS

German Examination Report for German Application No. 10 2016 221 276.1 dated Jul. 31, 2017.

*Primary Examiner* — Charles J Han
(74) *Attorney, Agent, or Firm* — Brooks Kushman PC; David Kelley

(57) ABSTRACT

An autonomous or semi-autonomous vehicle and maneuvering method for a vehicle for overcoming an obstacle may include detecting the obstacle in front of and/or behind the motor vehicle by a detection device, moving the motor away from the obstacle to come to a standstill at a defined distance x, wherein the running direction of a wheel is facing towards the obstacle. The method may also include accelerating the motor vehicle toward the obstacle within a power-limiting range of a drive unit of the vehicle. The power-limiting range may be a power-limiting range of an electric motor powering the vehicle.

20 Claims, 1 Drawing Sheet

(51) Int. Cl.
*B60W 50/14* (2020.01)
*B60L 3/00* (2019.01)
*B60L 15/20* (2006.01)
*B60W 10/06* (2006.01)
*B60W 10/08* (2006.01)
*B60W 30/182* (2020.01)
*B60W 30/184* (2012.01)

(52) U.S. Cl.
CPC ............ *B60W 10/06* (2013.01); *B60W 10/08* (2013.01); *B60W 10/20* (2013.01); *B60W 30/182* (2013.01); *B60W 30/1843* (2013.01); *B60W 50/14* (2013.01); *B60L 2250/16* (2013.01); *B60L 2260/20* (2013.01); *B60L 2260/32* (2013.01); *B60W 2530/10* (2013.01); *B60W 2530/20* (2013.01); *B60W 2554/00* (2020.02); *B60W 2710/06* (2013.01); *B60W 2710/086* (2013.01); *B60W 2710/20* (2013.01); *B60W 2720/106* (2013.01); *Y02T 10/72* (2013.01); *Y10S 903/93* (2013.01)

(58) Field of Classification Search
CPC .... B60L 2260/20; B60L 2260/32; B60L 3/00; B60L 3/0007; B60W 10/00; B60W 10/04; B60W 10/06; B60W 10/08; B60W 10/20; B60W 2530/00; B60W 2530/10; B60W 2530/20; B60W 2550/00; B60W 2550/10; B60W 2710/00; B60W 2710/06; B60W 2710/08; B60W 2710/086; B60W 2710/20; B60W 2720/00; B60W 2720/10; B60W 2720/106; B60W 30/00; B60W 30/18; B60W 30/18009; B60W 30/182; B60W 30/184; B60W 30/1843; B60W 50/00; B60W 50/08; B60W 50/14; Y02T 10/00; Y02T 10/60; Y02T 10/72; Y02T 10/7258; Y10S 903/00; Y10S 903/902; Y10S 903/903; Y10S 903/93
See application file for complete search history.

(56) References Cited

U.S. PATENT DOCUMENTS

| | | |
|---|---|---|
| 2010/0089671 A1 | 4/2010 | Trunkenpolz |
| 2012/0126969 A1 | 5/2012 | Wilbur et al. |
| 2015/0291177 A1 | 10/2015 | Lee |
| 2016/0102622 A1 | 4/2016 | Crombez et al. |

FOREIGN PATENT DOCUMENTS

| | | | | |
|---|---|---|---|---|
| DE | 102013210672 A1 | * | 12/2014 | ......... B62D 15/0285 |
| DE | 102013220931 A1 | * | 4/2015 | |
| DE | 102013220931 A1 | | 4/2015 | |

* cited by examiner

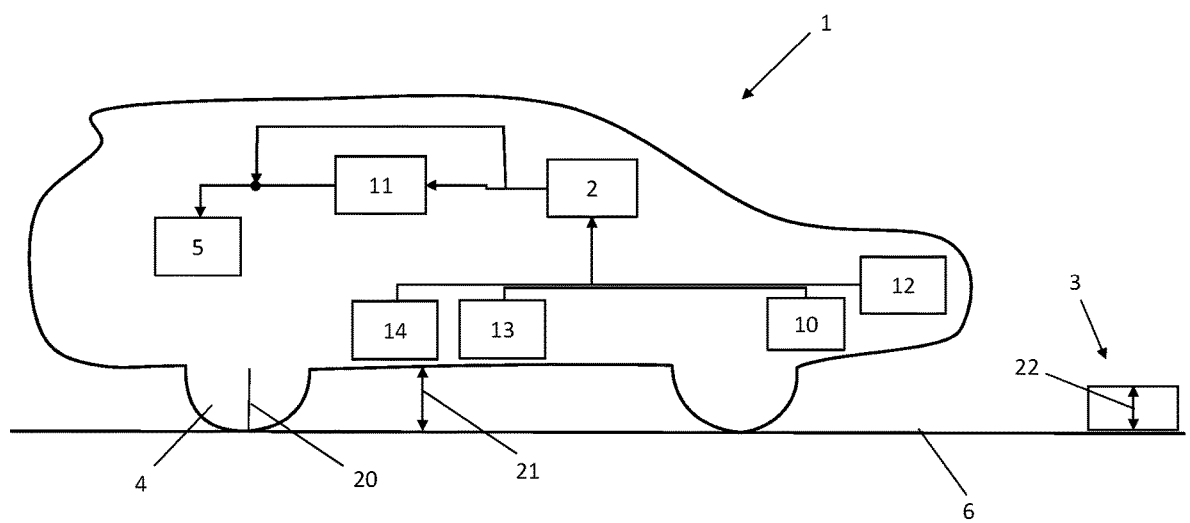
Fig. 1
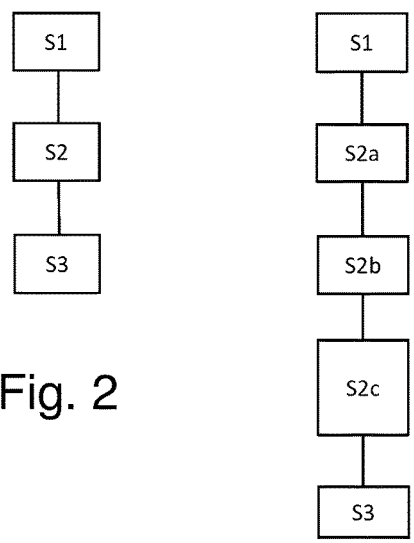
Fig. 2
Fig. 3

MOTOR VEHICLE AND AUTONOMOUS OR SEMI-AUTONOMOUS MANEUVERING AROUND AN OBSTACLE

CROSS-REFERENCE TO RELATED APPLICATIONS

This application claims foreign priority benefits under 35 U.S.C. § 119(a)-(d) to DE Application 10 2016 221 276.1 filed Oct. 28, 2016, which is hereby incorporated by reference in its entirety.

TECHNICAL FIELD

The disclosure concerns a motor vehicle and method for maneuvering around an obstacle.

BACKGROUND

Assistance systems of motor vehicles for the detection of obstacles in front of or behind a motor vehicle are widespread. Detection systems of this type are implemented for the detection of different obstacles, for example of people, of curbs, of motor vehicles ahead, etc. The obstacles are mainly detected in the immediate vicinity of the vehicle. The action of the motor vehicle resulting from the detection of an obstacle varies. In this case, the actions can concern the brakes, the steering or more generally a vehicle component of the motor vehicle.

Conventional methods are mainly directed towards first contacting the obstacle and then overcoming it by various methods. On the one hand, there is a method that is based on an iterative algorithm and that allows the motor vehicle to overcome the obstacle slowly. On the one hand, there is a method that works in a power range of the drive unit lying outside of the power-limiting range. As an example, a hybrid vehicle can be mentioned, the combustion engine of which is usually switched off during the maneuvering process and switched on in the event of an obstacle.

A method for overcoming an obstacle is disclosed in US 2016/0102622 A1. In US 2016/0102622 A1, software is provided that analyzes the vehicle data and checks whether an obstacle is hindering the movement of the vehicle, for example whether a wheel of the motor vehicle is contacting a curb. If an obstacle is detected, a check is made as to whether the obstacle can be overcome and would be overcome. If the response to said questions is affirmative, then a torque is transmitted to the wheels that enables the obstacle to be overcome. In this case, the transmission of the torque to the wheels takes place at intervals. The iterative algorithm behind the intervals is designed so that no components of the electric motor will overheat.

Interactions between motor vehicles and people are ever more numerous and various. In U.S. Pat. No. 9,368,034 B2, for example, an interaction between a person and a motor vehicle is represented such that a person moving towards the motor vehicle is detected close behind the motor vehicle by a detection system of the motor vehicle. Once said person makes a predefined gesture, the trunk is opened as the action of the motor vehicle. The detection system comprises ultrasonic sensors and capacitive sensors in this case. The ultrasonic sensors are implemented to detect people remote from the vehicle, whereas the capacitive sensors are implemented to detect people close to the vehicle. Coordination between the ultrasonic sensors and the capacitive sensors leads to a predefined distance in relation to the motor vehicle within which the gesture carried out by a person leads to the opening of the trunk.

SUMMARY

A first aspect of one or more embodiments concerns a maneuvering method implemented by a vehicle computing system of a motor vehicle for overcoming an obstacle. The maneuvering method comprises the use of a motor vehicle comprising at least one wheel, a detection device, and a drive unit. In this case, the drive unit comprises a power-limiting range. Furthermore, the maneuvering method comprises the provision of a maneuvering region that comprises at least one obstacle. The maneuvering method may include the following steps. In the first step S1, an obstacle is detected in front of and/or behind the motor vehicle by the detection device and the vehicle comes to a standstill at the obstacle. In the second step S2, the motor vehicle is moved away from the obstacle. During step S2 the movement is carried out such that the motor vehicle comes to a standstill at a defined distance x from the obstacle. In this case, the distance x is defined by the distance between the obstacle and the wheel. Once the motor vehicle comes to a standstill, the running direction of the wheel is turned towards the obstacle. In the third step S3, the motor vehicle is accelerated towards the obstacle. During this, the movement or acceleration takes place within the power-limiting range of the drive unit using the kinetic energy or momentum of the vehicle to overcome the obstacle without overheating the drive unit.

The maneuvering method may be advantageous compared to conventional methods, because it continues to overcome an obstacle within the power-limiting range of the drive unit. In the case of hybrid vehicles, this means that when using various embodiments of the method according to the disclosure, the combustion engine is not used to drive the motor vehicle. Furthermore, no iterative algorithm is used that could lead to rocking movements of the motor vehicle when overcoming the obstacle slowly. Similarly, by moving away from the obstacle and coming to a standstill before accelerating toward the obstacle, the momentum of the vehicle may be used so that the limited range of the motor is not exceeded, which may otherwise occur if the maneuvering begins only when the vehicle wheel is in contact with the obstacle.

According to one design of the maneuvering method according to the disclosure, the step S2 is divided into sub-steps. In the first sub-step of the step S2, a distance x_var between the obstacle and the wheel is determined by a first module of the motor vehicle. In the second sub-step of the step S2, during the movement of the motor vehicle away from the obstacle, the distance x_var is compared with the distance x. During the third sub-step of the step S2, the movement of the motor vehicle toward the obstacle is carried out such that the distance x_var approaches the distance x. Stated differently, the distance x is determined as the distance the vehicle wheel should move away from the obstacle. Using a radar system, a system with ultrasonic sensors, or a system with cameras and lasers for example, the distance x_var can be determined sufficiently accurately, for example in the centimeter range.

According to one design of the maneuvering method according to the disclosure, furthermore in the step S2 the distance x is calculated by a second module of the motor vehicle. For known obstacles comprising a predetermined pattern or an already known structure, data stored in the motor vehicle can be used to calculate the distance x. Alternatively, suitable data can already be stored in the motor vehicle, so that a calculation is no longer necessary after a predetermined obstacle or type of obstacle is detected.

According to one design of the maneuvering method according to the disclosure, in the step S2 a height of the obstacle is determined by a third module of the motor vehicle. Furthermore, the distance x is calculated using the determined height of the obstacle based on the known position or height of the first module that measures the distance x relative to the known height or position of the third module.

According to one design of the maneuvering method according to the disclosure, in the step S2, a ground clearance of the motor vehicle is determined by a fourth module. Using the determined ground clearance of the motor vehicle, the distance x, representing the distance to move the vehicle away from the obstacle, is calculated. In the case of a curb or in the case of obstacles without a flat rise towards the motor vehicle, a prerequisite for overcoming the obstacle is that the motor vehicle has a ground clearance that exceeds the height of the obstacle. A further prerequisite for overcoming such an obstacle is that the radius of the wheel is greater than the height of the obstacle. When overcoming obstacles with a flat rise leading towards the motor vehicle, overcoming the obstacle by the motor vehicle is only possible within a range of inclination angles. Said range of inclination angles is a function of a distance between the wheel and an outer region on the rear part of the vehicle or on the front part of the vehicle. Furthermore, the range of inclination angles is a function of the ground clearance.

According to one design of the maneuvering method according to the disclosure, in the step S2 the mass of the motor vehicle is determined by a fifth module of the motor vehicle. The distance x is then calculated. The inertia of the mass and distance x are factors used to determine whether the vehicle proceeds with overcoming the obstacle.

According to one design of the maneuvering method according to the disclosure, the motor vehicle is controlled autonomously in the steps S1 through S3. Preferably, the control of the motor vehicle is carried out completely autonomously. During this, the driver of the motor vehicle can be located within the vehicle or alternatively even outside of the vehicle. A further alternative to fully autonomous control of the motor vehicle is that the data, such as the distance x and the strength of the acceleration or torque applied by the motor, are displayed by the motor vehicle and the driver of the motor vehicle only operates the accelerator pedal and the brake pedal.

A second aspect of the disclosure concerns a motor vehicle for carrying out the method according to one or more embodiments of the disclosure. The motor vehicle comprises at least one wheel, at least one detection device, and a drive unit. In this case, the drive unit comprises a power-limiting range. The detection device detects an obstacle in front of and/or behind the motor vehicle. Furthermore, the detection device comprises a horizontal distance module that is implemented to determine a distance x_var between the wheel of the motor vehicle and the obstacle. In this case, the detection device can comprise a radar system, ultrasonic sensors, one or more cameras or a laser system. The sensors belonging to the individual systems can be mounted at suitable points around the automobile.

According to one design of the motor vehicle according to the disclosure, the drive unit with a power-limiting range is implemented electrically. In this case, the drive unit with a power-limiting range can also comprise a combustion engine in addition to an electric motor. In the case of the maneuvering method according to the disclosure, however, the combustion engine is not operated. The motor vehicle known as a hybrid vehicle moves only electrically in the case of the maneuvering method in this embodiment. Alternatively, a fuel cell system can also be used as a drive unit. Here too, the maneuvering of the motor vehicle is performed in a power-limited manner.

According to one design of the motor vehicle according to the disclosure, the motor vehicle comprises a calculation module. The calculation module is implemented to calculate a distance x. The distance x represents the target or distance needed to use the vehicle kinetic energy or momentum to overcome the obstacle with acceleration using the limited range of the motor. The distance x is calculated such that the motor vehicle is at said distance from the obstacle and can be accelerated from a standstill towards the obstacle. In this case, in addition to properties of the obstacle, the distance x is also a function of parameters of the motor vehicle, such as for example of the transmission of a suitable torque to the roadway and of the mass of the motor vehicle. The distance x is calculated so that the inertial mass of the motor vehicle and the transmission of torque to the roadway result in a corresponding acceleration of the motor vehicle, so that the motor vehicle has kinetic energy that enables the motor vehicle to overcome the obstacle.

According to one design of the motor vehicle according to the disclosure, the detection device comprises a height module. The height module is implemented to determine a height of the obstacle. The height module preferably comprises one or more cameras or a laser system.

According to one design of the motor vehicle according to the disclosure, the detection device comprises a ground clearance module. The ground clearance module is implemented to determine a distance between the bottom of the motor vehicle and the ground on which the motor vehicle is moving. The motor vehicle is preferably moving on a road surface, in particular on a street or a highway. The ground clearance module can comprise ultrasonic sensors or a laser system.

According to one design of the motor vehicle according to the disclosure, the motor vehicle comprises a mass module. The mass module is implemented to determine a mass of the motor vehicle.

In one advantageous design of the motor vehicle according to the disclosure, the motor vehicle can comprise a control device that is implemented to control a motor vehicle. The control device preferably controls the actions of the motor vehicle, for example the steering and the acceleration of the motor vehicle. Furthermore, the control device can actuate the visual and audible signals of the motor vehicle.

Further features, properties and advantages of one or more embodiments of the present disclosure are revealed by the following description of representative embodiments with reference to the accompanying figures.

BRIEF DESCRIPTION OF THE DRAWINGS

FIG. 1 shows a schematic representation of a motor vehicle according to one or more embodiments relative to an obstacle.

FIG. 2 represents a flow chart indicating a process of a first representative embodiment of a maneuvering method according to the disclosure.

FIG. 3 represents a flow chart indicating the process of a second representative embodiment of a maneuvering method according to the disclosure.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Representative embodiments of a maneuvering method according to the disclosure for a motor vehicle 1 for overcoming an obstacle 3 are described in detail below using FIGS. 1 through 3.

In the representative embodiments, a maneuvering method is described in which a motor vehicle 1 fitted with an electric drive unit 5 is used. In this case, the electric drive unit 5, here an electric motor 5 of a hybrid vehicle, is operated in a power-limiting range. The combustion engine of the hybrid vehicle is inactive during the maneuvering method. By the use of the electric motor 5 in the power-limiting range and by the non-use of the combustion engine, a maneuvering method is provided that enables purely electrical maneuvering using a low-voltage hybrid technology. Those of ordinary skill in the art will recognize that the method may also be applied to high-voltage hybrid technology. Furthermore, in the representative embodiments the motor vehicle 1 is operated purely autonomously.

In FIG. 1, a representative embodiment for a motor vehicle 1 according to the disclosure is shown. The motor vehicle 1 is located at a distance x_var from an obstacle 3. In this case, the distance x_var is the detected or measured distance between a wheel 4 of the motor vehicle 1 and the obstacle 3. The distance may be determined based on a known positional relationship between the sensor module(s) used to measure the distance and the vehicle wheel, bumper, fascia, etc. The horizontal distance module 10 installed in the motor vehicle 1 may continuously measure the distance x_var during movement of the motor vehicle 1 relative to the obstacle 3. In this representative embodiment, the movement of the motor vehicle 1 is achieved by means of an electric motor 5. The movement of the motor vehicle 1 ends if the distance traveled by the vehicle represented by x_var equals a target or desired distance x. The distance x, which characterizes the targeted distance between the wheel 4 and the obstacle 3 for overcoming the obstacle 3, is the distance from the vehicle 1 to the obstacle 3 when the vehicle comes to a standstill after moving away from the obstacle and is measured or calculated by means of the calculation module 11 of the motor vehicle 1 and stored in an associated memory. The parameters required for the calculation of the distance x are provided by a height module 12 that determines the height 22 of the obstacle 3, a ground clearance module 13 that determines the distance between the bottom of the motor vehicle 1 and the highway 6 and a mass module 14 that determines a mass of the motor vehicle 1. As previously described, the distance x is calculated as the distance away from the obstacle 3 needed for the kinetic energy or momentum of the vehicle 1 accelerated by the motor in a limited-power mode to overcome the obstacle 3.

In the representative embodiments, the motor vehicle 1 is overcoming a curb 3 using the maneuvering method according to the disclosure. The maneuvering methods according to the disclosure start at the point in time at which a wheel 4 of the motor vehicle 1 contacts the curb 3 and comes to a standstill with the front of motor vehicle 1 in front of the curb 3.

The transmission of a torque from the motor vehicle 1 to the highway 6 leads to a resulting force directed along a direction of motion of the motor vehicle 1. The motor vehicle 1 follows the direction of the force once the power of the drive unit 5 is high enough. If the transmission of torque is taking place in the power-limiting range of the electric motor 5, then the motor vehicle 1 can mainly be accelerated from a standstill only without an obstacle 3. Once an obstacle 3 is present and at least one wheel 4 is blocked, the electrical power for the motor vehicle 1 is typically insufficient to overcome the obstacle 3 for so-called mild hybrid vehicles having low-voltage (on the order of 48V) hybrid technology. In the case of a conventional hybrid vehicle control strategy, typically the combustion engine is started in this case, so that a corresponding transmission of torque from the motor vehicle 1 to the highway 6 is guaranteed and the obstacle 3 can be overcome by the motor vehicle 1 using the engine torque or combined engine/motor torque. Said procedure, however conflicts with the idea of a maneuvering method with a purely electric drive that is operated in a power-limiting range.

In FIG. 2 the steps are represented that show the process of a first representative embodiment of a maneuvering method according to the disclosure. In the first step S1, the obstacle 3 is detected in front of and/or behind the motor vehicle 1 by the detection device 2. In the second step S2, the motor vehicle 1 is moving away from the obstacle 3. The movement is carried out such that the motor vehicle 1 comes to a standstill at a defined distance x between the obstacle 3 and the wheel 4. In this case, the running direction of the wheel 4 is turned towards the obstacle 3. In the third step S3, the motor vehicle 1 is accelerated towards the obstacle 3. In this case, the acceleration takes place in the power-limiting range of the drive unit 5. The distance x is calculated as previously described such that the kinetic energy or momentum of the vehicle 1 is sufficient to overcome the obstacle 3 after accelerating from a standstill toward the obstacle 3 using only the motor.

In the second representative embodiment, the maneuvering method 5 comprises steps that are denoted by S1, S2a, S2b, S2c and S3 and that are schematically represented in the FIG. 3.

In the first step S1 of the maneuvering method, the detection device 2 detects the obstacle 3, in this case the curb 3. In the second step S2a of the maneuvering method, the distance between the wheel 4 of the motor vehicle 1 and the curb 3 is detected or measured with a horizontal distance module 10 of the motor vehicle 1. Said distance is referred to as x_var. In a third step S2b of the maneuvering method, a distance x is calculated by a calculation module 11 of the motor vehicle 1. The distance x characterizes the desired or target distance between the curb 3 and the wheel 4 of the motor vehicle 1, from which the motor vehicle 1 can be accelerated towards the curb 3 and can overcome the curb 3 using the kinetic energy or momentum of the vehicle when a vehicle wheel contacts the curb 3. For the calculation of the distance x, parameters of the motor vehicle 1 and the curb 3 are used. On the one hand, the height 22 of the curb 3 is used for said calculation. The determination of the height 22 of the curb 3 is carried out by the height module 12 of the motor vehicle 1. On the other hand, the ground clearance 21 of the motor vehicle 1 is used for the calculation of the distance x. The ground clearance 21 of the motor vehicle 1 is determined by the ground clearance module 13. In the case of an obstacle 3 with no flat rise, such as the incline of the curb 3, the distance between the wheel 4 and the leading point of the front part of the vehicle or the rearmost point of the rear part of the vehicle is relevant to overcoming the obstacle 3 or the curb 3. The incline of the obstacle 3 or the curb 3 also influences the distance x. Furthermore, in cases, such as in the present representative embodiment in which a curb 3 is to be overcome and the ground clearance 21 is greater than the height 22 of the curb 3, the radius 20 of the wheel 4 plays a role. The radius 20 of the wheel 4 is preferably larger than the height 22 of the obstacle 3 or the curb 3.

Following the calculation of the distance x, the movement of the motor vehicle 1 away from the obstacle 3 is carried out, in said representative embodiment away from the curb 3. In said fourth step S2c, the motor vehicle 1 moves away such that the continuously measured or detected distance x_var approaches the calculated distance x. Once the detected or measured distance x_var coincides with the calculated distance x, the motor vehicle 1 comes to a standstill. In this case, a running direction of the wheel 4 is pointed towards the curb 3. For autonomous vehicles, the controller adjusts the steering so that the wheel 4 is pointed towards the curb 3. The movement of the motor vehicle 1 away from the obstacle to the distance x is preferably indicated by visual and audible signals to the driver and/or to people outside of the vehicle. In said representative embodiment, a buzzer sounds during said movement of the motor vehicle 1 and the front or rear lights are turned on. Furthermore, the flasher system is switched on.

In a fifth step S3 of the maneuvering method, the motor vehicle 1 is accelerated from rest towards the curb 3. During this step, the acceleration is carried out in the power-limiting range of the electric motor 5. In said present representative embodiment, the power limiting is at 48 Volts. Once the motor vehicle 1 has overcome the curb 3, an originally envisaged maneuver can be continued.

In a fully autonomously controlled motor vehicle 1, alternatively the maneuvering method according to the disclosure can be used earlier. In this case, the obstacle 3 is already detected and measured at a greater distance from the motor vehicle 1. At said point in time, the target or desired distance x between a wheel 4 of the motor vehicle 1 and the obstacle 3 can already be calculated from the data obtained from the obstacle 3 and from the vehicle data. The vehicle data required for the calculation can either be measured again at said point in time or can be taken from preceding maneuvers. As a further alternative, the speed of the motor vehicle 1 can already be adjusted at a greater distance, so that the obstacle 3 can be easily overcome without bringing the motor vehicle 1 to a standstill and reversing direction away from the obstacle. Here the prerequisite is always that the drive unit 5 of the motor vehicle 1 is operated in the power-limiting range.

While representative embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
an engine and an electric motor configured to propel the vehicle;
a sensor configured to detect a measured distance between the vehicle and an obstacle; and
a controller coupled to the engine, the electric motor, and the sensor, the controller programmed to:
move the vehicle away from the obstacle a calculated distance using the electric motor;
stop the vehicle in response to the measured distance detected by the sensor being equal to or exceeding a calculated distance calculated by the controller based on vehicle momentum required to climb the obstacle; and
accelerate the vehicle from a standstill toward the obstacle to climb the obstacle.

2. The vehicle of claim 1 further comprising audio and visual indicators, wherein the controller activates the audio and visual indicators while moving the vehicle away from the obstacle.

3. The vehicle of claim 1 wherein the controller operates the electric motor in a limited-power mode while accelerating the vehicle from the standstill.

4. The vehicle of claim 1 wherein the controller steers wheels of the vehicle toward the obstacle prior to accelerating the vehicle.

5. The vehicle of claim 1 wherein the sensor is further configured to detect a height of the obstacle.

6. The vehicle of claim 1 further comprising a second sensor configured to detect a height of the obstacle.

7. The vehicle of claim 1 wherein the calculated distance is determined from a height of the obstacle, a vehicle wheel radius, and mass of the vehicle.

8. The vehicle of claim 1 wherein the controller is further programmed to determine distance between a vehicle wheel and the obstacle based on the measured distance detected by the sensor.

9. The vehicle of claim 1 wherein the controller stops the engine before moving the vehicle away from the obstacle, and accelerates the vehicle using the electric motor while the engine is stopped.

10. A vehicle comprising:
an electric motor;
a sensor configured to detect distance between the vehicle and an obstacle; and
a controller configured to:
operate the electric motor to autonomously move the vehicle a calculated distance away from the obstacle using the electric motor;
autonomously stop the vehicle when reaching the calculated distance away from the obstacle; and
autonomously accelerate the vehicle toward the obstacle using the electric motor and then climb the obstacle, wherein the calculated distance is based on momentum of the vehicle when contacting the obstacle.

11. The vehicle of claim 10 further comprising an engine, the controller stop stopping the engine before autonomously moving the vehicle away from the obstacle using the electric motor.

12. The vehicle of claim 10 wherein the calculated distance is based on kinetic energy of the vehicle when a vehicle wheel contacts the obstacle.

13. The vehicle of claim 12 further comprising audio and visual indicators, wherein the controller activates at least one of the audio and visual indicators before moving the vehicle away from the obstacle.

14. The vehicle of claim 10 wherein the calculated distance is based on height of the obstacle and mass of the vehicle.

15. The vehicle of claim 10 wherein the controller operates the electric motor in a power-limited operating range while autonomously moving the vehicle away from the obstacle and autonomously accelerating the vehicle toward the obstacle.

16. The vehicle of claim 15 wherein the electric motor is powered by a low-voltage battery having a nominal voltage of 48 volts.

17. A method for controlling a vehicle having an electric motor and a sensor configured to detect a distance to an obstacle, comprising, by a vehicle controller:
moving the vehicle a calculated distance away from the obstacle using the electric motor;
stopping the vehicle at the calculated distance away from the obstacle, wherein the calculated distance is based on calculated vehicle momentum or kinetic energy when contacting the obstacle; and
accelerating the vehicle toward the obstacle using the electric motor to and then climb the obstacle.

18. The method of claim 17 wherein the calculated distance is based on height of the obstacle, vehicle mass, and maximum acceleration using a power-limited range of the electric motor.

19. The method of claim 17 wherein the vehicle includes an engine, the method further comprising stopping the engine before moving the vehicle away from the obstacle and while accelerating the vehicle toward the obstacle.

20. The method of claim 17 wherein the vehicle includes audio and/or visual indicators, the method further comprising activating the audio and/or visual indicators prior to moving the vehicle away from the obstacle.

* * * * *